(12) United States Patent
Fastabend et al.

(10) Patent No.: US 7,974,992 B2
(45) Date of Patent: Jul. 5, 2011

(54) SEGMENTATION MODEL USER INTERFACE

(75) Inventors: Christopher Fastabend, Neustadt (DE);
Till Brinkmann, Mannheim (DE);
Guido Lammers, Wiesloch (DE);
Martin Schrepp, Hockenheim (DE);
Sandra Bicker, Heidelberg (DE)

(73) Assignee: SAP AG, Walldorf (DE)

( * ) Notice: Subject to any disclaimer, the term of this patent is extended or adjusted under 35 U.S.C. 154(b) by 333 days.

(21) Appl. No.: 12/261,632

(22) Filed: Oct. 30, 2008

(65) Prior Publication Data

US 2010/0115446 A1    May 6, 2010

(51) Int. Cl.
*G06F 17/30*    (2006.01)
(52) U.S. Cl. .......... 707/802; 715/772; 715/781
(58) Field of Classification Search .......... 707/802; 715/772, 781
See application file for complete search history.

(56) References Cited

U.S. PATENT DOCUMENTS

| | | | |
|---|---|---|---|
| 6,633,878 B1 * | 10/2003 | Underwood | 1/1 |
| 6,718,535 B1 * | 4/2004 | Underwood | 717/101 |
| 7,194,477 B1 * | 3/2007 | Bradley et al. | 1/1 |
| 7,841,428 B2 * | 11/2010 | Bertagnolli | 175/425 |
| 2007/0211056 A1 * | 9/2007 | Chakraborty et al. | 345/440 |
| 2008/0270363 A1 * | 10/2008 | Hunt et al. | 707/3 |
| 2008/0294996 A1 * | 11/2008 | Hunt et al. | 715/739 |
| 2009/0006156 A1 * | 1/2009 | Hunt et al. | 705/7 |

OTHER PUBLICATIONS

Amazon.com, "Amazon.com: 5 to 7 Years—Amazon.com / Action Figures: Toys & Games," retrieved Apr. 7, 2009, archived at http://web.archive.org/web/20080118202523rn_2/www.amazon.com/s?ie=UTF8&rh=n:165993011&page=1.
Amazon.com, "Amazon.com: Online Shopping for Electronics, Apparel, Computers, Books, DVDs & more," retrieved from amazon.com on Nov. 12, 2008.
Maggie Donnelly and Karen Wilson, "SAP CRM at Newcastle University," Newcastle University, Jan. 10, 2008.

* cited by examiner

*Primary Examiner* — Jean M Corrielus
(74) *Attorney, Agent, or Firm* — Brake Hughes Bellermann LLP

(57) ABSTRACT

A data warehouse may include a data set of items associated with a plurality of attributes. An input handler may be configured to receive selections of attributes and filter options and a placement of an attribute icon representing each selection within a segmentation model displayed within a results portion of a graphical user interface (GUI). A view generator may be configured to provide the segmentation model in the results portion, the model including a data set icon representing the items, provide an attribute list in a segmentation portion of the GUI including a list of the attributes, provide the attribute icon within the segmentation model based on the placement, and provide a flow indicator corresponding to the filter option associated with each attribute icon. A filter may be configured to obtain a subset of the plurality of items corresponding to each selection based on the placement and filter option.

20 Claims, 7 Drawing Sheets ed on the selected attributes from the attribute list, wherein a first subset from a first attribute icon is filtered to obtain a second subset for a second attribute icon subsequent to the first attribute icon in the segmentation model, and flow indicators indicating relationships between two or more attribute icons and the data set icon in the segmentation model.

SEGMENTATION MODEL USER INTERFACE

TECHNICAL FIELD

This description relates to data management.

BACKGROUND

An integral part of any successful business includes data management. The data may include anything from product data, service data, employee information, customer databases (including past, current and potential customers), accounting and other kinds of data. As the business grows, the data that needs to be managed may grow as well and may quickly become very large. A critical part of the data management process is filtering the large amount of data to obtain a specific or desired subset of data that may be of interest. For example, with a large amount of customer information, a company may desire to locate only a smaller subset of the customers for whom to market a particular product or service.

Conventional techniques of determining a set of parameters by which to filter the data to try and locate a subset of current interest has its own challenges. For example, filtering the data by too many parameters may yield a subset of data that is too small to be useful and conversely filtering the data by too few parameters may yield a subset of data that is larger than desired. Without greater visibility in the filtering process, extracting a desired subset of data from a larger set of data may be quite challenging.

SUMMARY

According to an example embodiment machine executable instructions stored on a computer-readable medium that, when executed on a data processing apparatus, are configured to cause the data processing apparatus to provide a graphical user interface (GUI) is provided. A segmentation portion of the GUI is configured to display an attribute list including a plurality of selectable attributes associated with a plurality of items of a data set, wherein each attribute is associated with a plurality of selectable filter options. A results portion of the GUI is configured to display a segmentation model, including a data set icon representing the plurality of items of the data set, an attribute icon for each of the plurality of selectable attributes selected by a user from the attribute list, the attribute icon representing a subset of the plurality of items, associated with the data set icon, filtered bas According to another example embodiment a system is provided. A data warehouse includes a data set wherein the data set includes a plurality of items, each item associated with a plurality of attributes. An input handler is associated with a graphical user interface (GUI) and is configured to receive selections of one or more of the attributes and including a filter option associated with each selection and a placement of an attribute icon representing each selection within a segmentation model displayed within a results portion of the GUI. A view generator is configured to provide: the segmentation model in the results portion of the GUI, the segmentation model including a data set icon representing the plurality of items of the data set, an attribute list in a segmentation portion of the GUI, the attribute list including a selectable list of the plurality of attributes, the attribute icon, associated with each selection, within the segmentation model based on the placement, and a flow indicator corresponding to the filter option associated with each attribute icon. A filter is configured to obtain a current subset of the plurality of items corresponding to each selection based on the placement and filter option, wherein a previous subset of the plurality of items of a previous attribute icon within the segmentation model is filtered to obtain the current subset, and wherein the filter is configured to filter the current subset to update one or more subsequent subsets of one or more subsequent attribute icons within the segmentation model.

According to another example embodiment a method is provided. A segmentation model is provided in a results portion of a graphical user interface (GUI), the segmentation model including at least a data set icon representing a data set of a plurality of items associated with a plurality of attributes. An attribute list is provided in a segmentation portion of the GUI, the attribute list including the plurality of attributes. One or more attribute selections of one or more attributes are received from the attribute list within the results portion of the GUI. An attribute icon for each attribute selection is provided within the segmentation model. A plurality of filter options is provided responsive to receiving each attribute selection. A filter option selection is received from the plurality of filter options, the filter option selection indicating how to filter the items based on the attribute selection. A placement of the attribute icon within the segmentation model subsequent to the data set icon is received. A flow indicator representing the filter option selection associated with each attribute icon is provided. The plurality items are filtered to obtain a current subset of the items corresponding to the attribute selection and filter option selection, wherein if the placement of the attribute icon is subsequent to a previous attribute icon associated with a previous subset, then the filtering to obtain the current subset is performed with respect to the previous subset, and if the placement of the attribute icon is prior to one or more subsequent attribute icons associated with one or more subsequent subsets, then the subsequent subsets are updated based on the current subset.

The details of one or more implementations are set forth in the accompanying drawings and the description below. Other features will be apparent from the description and drawings, and from the claims.

DETAILED DESCRIPTION

Figure 1:
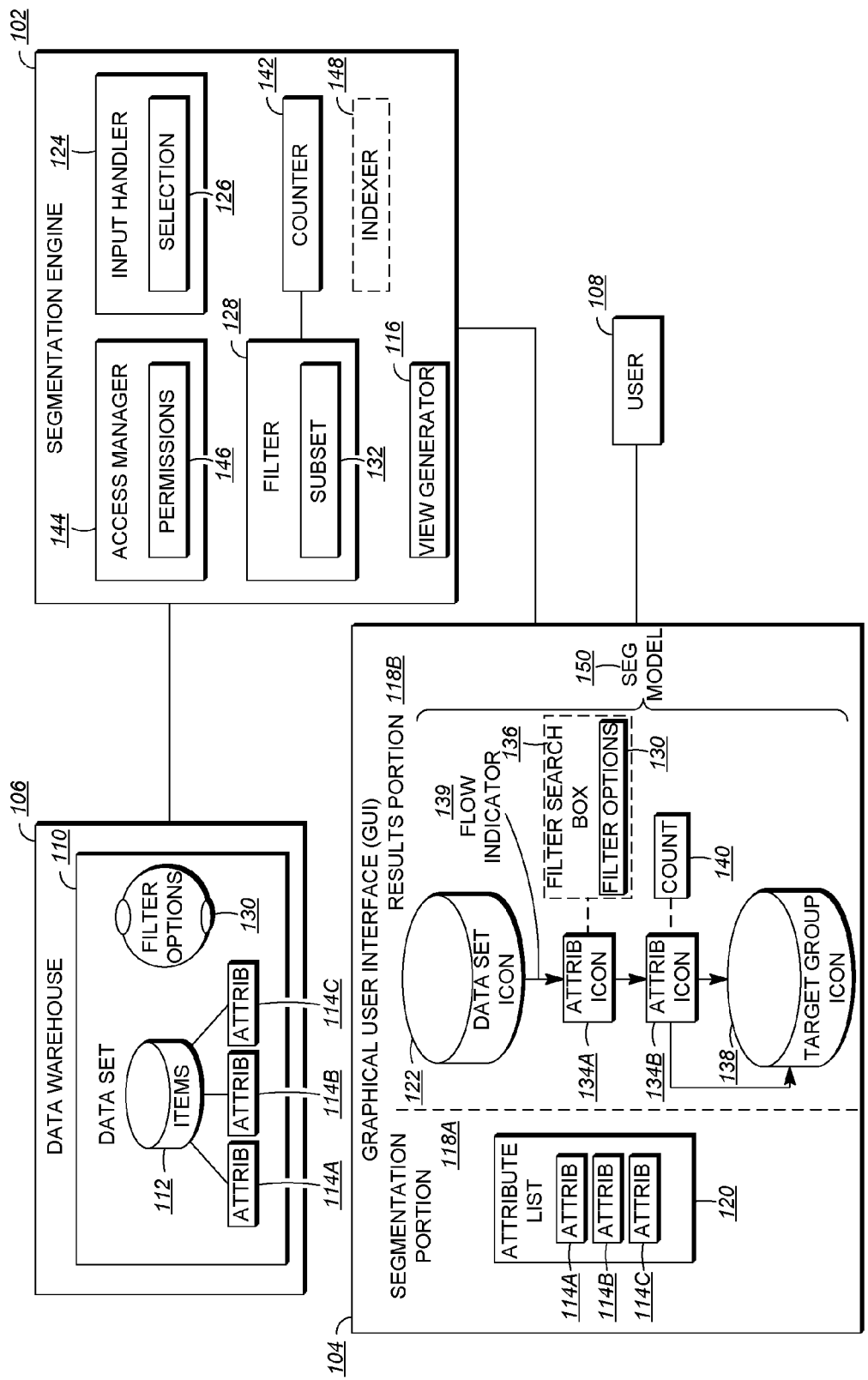
FIG. 1 is a block diagram of an example segmentation system that includes a segmentation engine, graphical user interface (GUI) and data warehouse, according to an example embodiment.

FIG. 1 is a block diagram of an example segmentation system 100 that includes a segmentation engine 102, graphical user interface (GUI) 104 and data warehouse 106, according to an example embodiment. In the example of FIG. 1, the system 100 provides a visual display for filtering or segmenting data. For example, the segmentation engine 102 may provide graphical icons representing at least a portion of the data from the data warehouse 106 to the GUI 104. Then for example, a user 108 may select icons, drag-and-drop, modify or otherwise adjust other portions of the GUI 104 to filter the data. The system 100 allows the user 108 to visually filter through data, seeing intermediate results of the filtering, adjusting the filtering based on the intermediate results to obtain a target set or subset of the data. For example, the user 108 may filter, using the system 100, through a large amount of customer data to obtain a subset of customers of interest to the user 108, which may then be targeted for a specific marketing campaign.

The data warehouse 106 may include any storage medium for data, including for example, memory, a database, and/or spreadsheets. The data warehouse may include a data set 110. The data set 110 may include any combination of related or unrelated data. For example, the data set 110 may include a customer database for a company, where information about current, past and/or potential customers may be stored. In other example embodiments, the data set 110 may include accounting, product, service, employee or other information. The data set 110 may include one or more items 112. The items 112 may correspond to individual rows, records or other pieces of data of the data set 110. For example, if the data set 110 includes customer information, then each item 112 may correspond to an individual customer within the data set 110.

Each item 112 may include or otherwise be associated with multiple attributes 114A-C. The attributes 114A-C may include characteristics or parameters related to each item 112. For example, if each item 112 corresponds to a customer, then example attributes 114A-C may include first name, last name, address, credit information, purchase history, hobbies, age and/or other information associated with a customer. According to an example embodiment, different items 112 may be associated with different attributes 114A-C, whereby not each item 112 of the data set 110 may include the same attributes 114A-C of every other item 112. In other example embodiments, the data set 110 may include items not necessarily related to each other, and may include, for example, customer information, account information and employee information as items 112.

A view generator 116 of the segmentation engine 102 may provide the GUI 104 including a visual representation of the filtering or segmentation of the data set 110. The GUI 104 may include a segmentation portion 118A and a results portion 118B. The portions 118A-B of the GUI 104 may correspond to windows, panels or other portions of the GUI 104. For example, the GUI 104 may include a main results panel 118B and an associated segmentation window or menu bar 118A.

The segmentation portion 118A may include an attribute list 120. The attribute list 120 may include a list of one or more of the attributes 114A-C from the data set 110. For example the attribute list 120 may include, as selectable text or icons within the attribute list 120, the attributes 114A, 114B and 114C. Then for example, this may allow the user 108 to select one or more attributes 114A-C from the attribute list 120 by which to filter the items 112 of the data set 110.

As referenced above, the items 112 of the data set 110 may be associated with multiple attributes 114A-C, at least a portion of which may appear in the attribute list 120. The user 108 may then, for example, select attributes 114A-C from the attribute list 120 by which to filter the items 112 of the data set 110. For example, if the attributes 114A-C include city, state, zip code, hobbies and marital status, the user 108 may select any of these attributes 114A-C from the attribute list 120 to filter the items 110. For example, the user 108 may filter the data set 110 to include only those items 112 that include a marital status of 'single' and city of 'New York'. Or, for example, the data set 110 may be filtered into two different groups, those that include 'soccer' as a hobby, and those that do not.

The view generator 116 may provide a data set icon 122 in the results portion 118B of the GUI 104. The data set icon 122 may include an icon or other visual and/or textual representation of at least a portion of the items 112 of the data set 110 before any user 108 applied filtering. For example, as discussed below, the data set icon 122 may include a representation of a pre-filtered portion of the items 112 of the data set 110 based on user permissions (e.g., 146). Or for example, the data set icon 122 may include or represent the entire set of items 112 of the data set 110.

The user 108 may then select one or more attributes 114A-C from the attribute list 120 by which to filter the items 112 represented by the data set icon 122. For example, the user 108 may drag the attribute 114C from the attribute list 120 and place it within the results portion 118B of the GUI 104. Then for example, an input handler 124 may receive the selection 126 of one or more of the attributes 114A-C of the attribute list 120.

The input handler 124 may receive selections 126 made by the user 108 via the GUI 104. For example, as just discussed, the input handler 124 may receive a selection 126 of the attribute 114C from the attribute list 120. The selection 126 may include any selection made by the user 108 via the GUI 104. For example, the selection 126 may include selections of attributes 114A-C from the attribute list 120 and/or, as discussed below, filter options 130.

The input handler 124 may then provide the selection 126 to a filter 128. The filter 128 may filter the items 112 of the data set 110 by the attributes 114A-C received via the selection 126. The filter 128, for example, may access the data set 110 and search, include and/or exclude items 112 that match or do not match the selected attributes 114A-C, as determined by the user 108.

Each selected attribute 114A-C from the attribute list 120 may be associated with a filter option 130. The filter options 130 may include multiple options on how the user 108 desires the data set 110 to be filtered using the selected attribute(s) 114A-C. For example, the filter options 130 may include: filtering the data set 110 for only those items 112 that include the selected attribute(s) 114A-C, filtering the data set 110 for only those items 112 that exclude the selected attribute(s) 114A-C, splitting the data set 110 into a first group that includes the selected attribute(s) 114A-C and a second group that excludes the selected attribute(s) 114A-C, or rejoining two or more previously split groups of items 110 from the data set 110. In other example embodiments, additional and/or different filter options 130 may be provided and/or selected.

The filter 128 may then filter the data set 110 based on the selected attribute(s) 114A-C and associated filter option 130 to obtain a subset 132 of the data set 110 that corresponds to the selections 126. The subset 132 may include zero or more of the items of the data set 110 that correspond to filtering selections 126 made by the user 108. In an example embodiment, the filter 128 may obtain two or more subsets 132 based on the same selected attribute 114A-C and filter option 130.

The subset 132 may be represented within the results portion 118B of the GUI 104 by an attribute icon 134A, 134B. The attribute icons 134A-B may represent the subset 132 of the items 112 as determined by the filter 128 based upon one or more selections 126 made by the user 108. For example, if the user 108 drags the attribute 114A from the attribute list 120 into the results portion 118B of the GUI 104, the attribute icon 134A may be provided by the view generator 116 to represent the subset 132 of the data set 110 that corresponds to the selected attribute 114 and associated filter option 130 as may be selected from a filter search box 136. This may allow the user 108 to determine, for example, by quickly looking at the results portion 118B how the data set 110 has been segmented and determine additional filters or other modifications to apply to the segmentation.

The filter search box 136 may include a pop-up window, box, menu or other portion of the GUI 104 that appears when one or more attributes 114A-C have been selected from the attribute list 120. The filter search box 136 may appear until the user 108 selects a filter option 130 for the selected attribute(s) 114A-C from the attribute list 120. Then the selected attribute(s) 114A-C and filter option 130 may be received by the input handler 124 as the selection 126, as discussed above.

The selected filter option 130 corresponding to each attribute icon 134A-B may be represented in the results portion 118B of the GUI 104 by one or more flow indicators 137. The flow indicator 137 may indicate which filter option 130 was selected and corresponds to the associated attribute icons 134A-B. For example, the flow indicator for an include filter option may appear different than a split, Venn or other filter option.

As shown in the results portion 118B, the attribute icon 134B may be placed by the user 108, in the results portion 118B, subsequent to the attribute icon 134A. In this example, the user 108 may further filter the subset 132 of the items 112 represented by the attribute icon 134A by the selections (e.g., 126) corresponding to the attribute icon 134B. Then for example, the filter 128 would filter the subset 132 associated with the attribute icon 134A to obtain the subset 132 associated with the selections 126 corresponding to the attribute icon 134B, rather than filtering the entire data set 110. This may allow the user 108 to iteratively refine the data set 110 until a target group subset of the items 112 is obtained. Such a waterfall approach to filtering and visual display may allow the segmentation engine 102 to build on previously performed filters that have taken place, rather than filtering the entire data set 110 from scratch with each modification.

A target group icon 138 may represent a targeted subset of items 112 after one or more segmentations of the data set 110 based on the selected attributes 114A-C. Upon a determination that a target group subset has been reached, the system 100 may provide the user 108 with the items 112 and associated attributes 114A-C within the target group subset (from the data set 110). Then for example, the user 108 may use this information to develop mailing lists, reporting or for other purposes.

The icons (e.g., data set icon 122, attribute icons 134A-B and/or target group icon 138) may be associated with a count 140. The count 140 may include an indication of which and/or how many items 112 are included in each subset 132 represented by the icons. For example, the count 140 may include the number of items 112 of each subset, or may include a portion of the subset 112. Other example embodiments may not include a count 140. The count 140 may be determined by a counter 142. The counter 142 may analyze the subset 132 obtained by the filter 128 to determine the count 140. The counter 142 may, for example, count the number of items 112 included in the subset and return this number as the count 140 associated with the icons in the results portion 118B.

An access manager 144 may determine to which of the items 112 and/or attributes 114A-C of the data set 110 the user 108 has access, based on permissions 146. The permissions 146 may be include values of certain of the attributes 114A-C pre-defined for the user 108. For example, the user 108 may include a salesperson whose responsibility includes only clients who are located in the United States. Then for example, the permissions 146 of the user 108 may limit the user 108 to searching only those items 112 that include the attribute 114A where country='United States'. According to an example embodiment, only those clients whose attribute 114A='United States' may be represented by the data icon 122, even though the data set 110 may include items 112 with the attribute 114A including countries around the world. Similarly, the permissions 146 may restrict and/or grant the user 108 from using one or more of the attributes 114A-C. For example, a manager (e.g., user 108) may be granted broader permissions 146 than an employee who reports to the manager.

An indexer 148 may index the items 112 of the data set 110. Indexing the items 112 may include arranging at least a portion of the data set 110 to improve the speed, accuracy and/or other performance of searches, segmentation or filtering of the data. An example indexing of the data may include placing each item 112 into a row, and each attribute 114A-C as columns corresponding to the rows.

According to an example embodiment, the indexer 148 may update the indexed data set (e.g., 110) on a delta basis. For example, if only one or a couple of the items 112 and/or attributes 114A-C change, then the indexer 148 may update the already indexed data set to reflect the changes, rather than rebuilding the entire indexed data set again from the beginning Being able to update the indexed data set may increase or improve performance of the system of FIG. 1, by reducing the time needed to reflect any updates or modifications to the underlying set of items 112 and/or attributes 114A-C.

The results portion 118B of the GUI 104 may include a segmentation model 150. The segmentation model 150 may include the icons and flow indicators 137 appearing in the results portion 118B of the GUI 104 as may be selected by the user 108. The segmentation model 150 may allow the user 108 to, step-by-step, filter or segment the data set 110, view the intermediate results of the segmentation and adjust the filtering accordingly. For example, by viewing the segmentation model 150, the user 108 may determine whether a particular applied filter (e.g., attribute 114A-C and filter option 130) is too restrictive or too broad or perhaps yields an undesired result.

The user 108 may drag, for example, the attribute icon 134B and place it prior to the attribute icon 134A in the segmentation model 150 and have the segmentation engine 102 readjust for the new filtration order. Or in another example embodiment, the user 108 may drag a new attribute 114C and place it in between the attribute icons 134A and 134B. Any number of various visual manipulations may be performed by the user 108 to the segmentation model 150, which may then be reflected by the segmentation engine 102. One skilled in the art may appreciate that any number of attributes 114A-C, data sets 110 and icons may be a part of the system 100, and that the elements shown are for exemplary purposes only.

Figure 2:
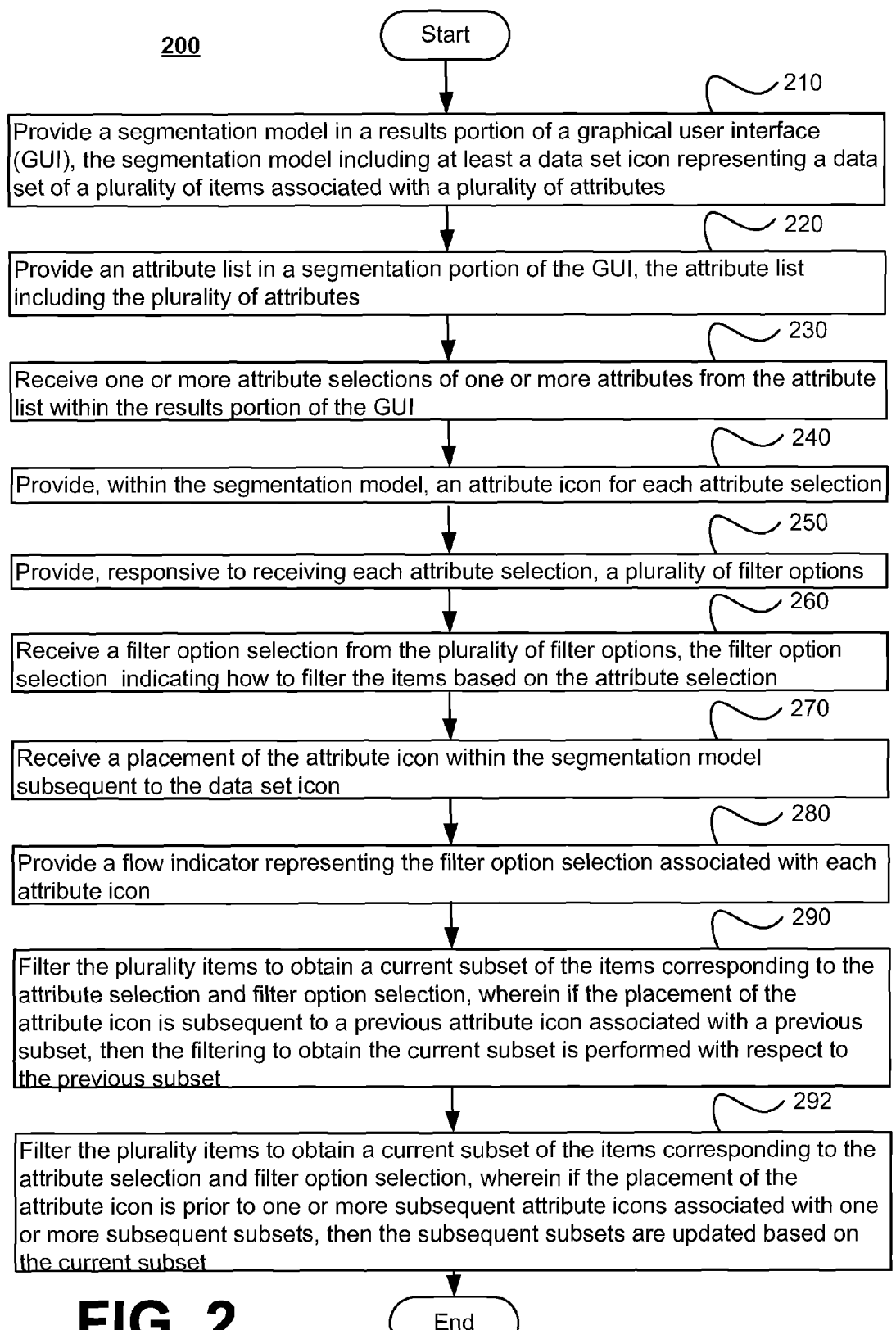
FIG. 2 is a flowchart illustrating example operations of the system of FIG. 1, according to an example embodiment.

FIG. 2 is a flowchart 200 illustrating example operations of the system 100 of FIG. 1, according to an example embodiment. More specifically, FIG. 2 illustrates an operational flow 200 representing example operations related to a segmentation engine 102.

After a start operation, a segmentation model may be provided in a results portion of a graphical user interface (GUI), the segmentation model including at least a data set icon representing a data set of a plurality of items associated with a plurality of attributes (210). For example, as shown in FIG. 1, view generator 116 may provide the segmentation model 150 in the results portion 118B of the GUI 104. The segmentation model 150 may include the data set icon 122 representing the items 112 associated with the attributes 114A-C of the data set 110.

An attribute list may be provided in a segmentation portion of the GUI, the attribute list including the plurality of attributes (220). For example, the attribute list 120 may be provided by the view generator 116 in the segmentation portion 118A of the GUI 104, the attribute list 120 including the attributes 114A-C.

One or more attribute selections of one or more attributes may be received from the attribute list within the results portion of the GUI (230). For example, the input handler 124 may receive attributes 114A-C from the attribute list 120 placed within the results portion 118 of the GUI 104.

An attribute icon for each attribute selection may be provided within the segmentation model (240). For example, the attribute icons 134A and 134B, corresponding to the selections 126, may be provided within the segmentation model 150 by the view generator 116.

A plurality of filter options may be provided responsive to receiving each attribute selection (250). For example, the filter options 130 may be provided by the view generator 116 in the filter search box 136 responsive to receiving an attribute selection from the attribute list 120.

A filter option selection may be received from the plurality of filter options, the filter option selection indicating how to filter the items based on the attribute selection (260). For example, the input handler 124 may receive a filter option selection (e.g., 126) from the filter options 130 displayed in the filter search box 136.

A placement of the attribute icon within the segmentation model subsequent to the data set icon may be received (270). For example, the view generator 116 may implement a placement of the attribute icon 134A within the segmentation model 150 (as provided or otherwise determined by the user 108), subsequent to the data set icon 122. The subsequent placement of the attribute icon 134A, by the view generator 116, after the data set icon 122 within the segmentation model 150 may include a placement anywhere within the segmentation model 150 such that the data model reflects that the attribute icon 134A represents at least a subset of the data set icon 122. According to an example embodiment wherein the segmentation model 150 reflects a top-down or waterfall approach, the attribute icon 134A may appear anywhere below and/or parallel to the data set icon 122. In other example embodiments however a subsequent placement of the attribute icon 134A within the segmentation model 150 by the view generator 116 may allow for other placements within the results portion 118B.

A flow indicator representing the filter option selection associated with each attribute icon may be provided (280). For example, the view generator 116 may provide the flow indicator 137 associated with the attribute icon 134A. According to an example embodiment, the flow indicator 137 may correspond to which filter option 130 was selected.

The plurality of items may be filtered to obtain a current subset of the items corresponding to the attribute selection and filter option selection, wherein if the placement of the attribute icon is subsequent to a previous attribute icon associated with a previous subset, then the filtering to obtain the current subset is performed with respect to the previous subset (290). For example, the filter 128 may filter the items 112 to obtain the subset 132 corresponding to the attribute selection and filter option selections (e.g., selection 126). Then for example, if the attribute icon 134B is placed subsequent to the previous attribute icon 134A associated with a previous subset (e.g., 132), then the filter 128 may filter the previous subset to obtain the current subset 132 represented by the attribute icon 134B.

The plurality of items may be filtered to obtain a current subset of the items corresponding to the attribute selection and filter option selection, wherein if the placement of the attribute icon is prior to one or more subsequent attribute icons associated with one or more subsequent subsets, then the subsequent subsets are updated based on the current subset (292). For example, the filter 128 may filter the items 112 to obtain the subset 132 corresponding to the attribute selection and filter option selections (e.g., selection 126). Then for example, if the attribute icon 134A is place prior to the attribute icon 134B, then the filter 128 may update the subset (e.g., 132) represented by the attribute icon 134B based on the subset (e.g., 132) represented by the attribute icon 134A.

Figure 3:
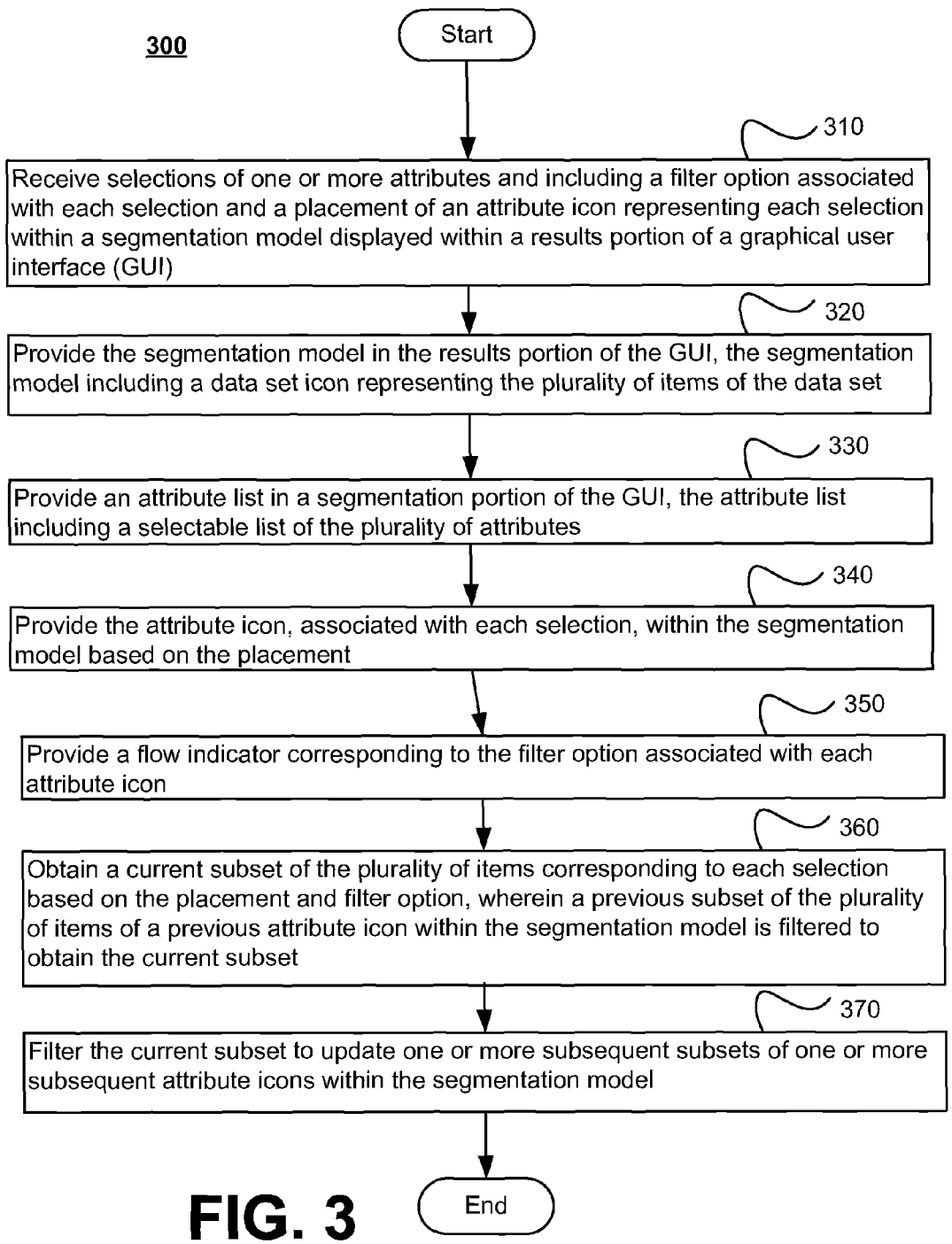
FIG. 3 is a flowchart illustrating example operations of the system of FIG. 1, according to an example embodiment.

FIG. 3 is a flowchart 300 illustrating example operations of the system 100 of FIG. 1, according to an example embodiment. More specifically, FIG. 3 illustrates an operational flow 300 representing example operations related to the segmentation engine 102 of FIG. 1.

After a start operation, selections of one or more attributes and including a filter option associated with each selection and a placement of an attribute icon representing each selection within a segmentation model displayed within a results portion of the GUI may be received (310). For example, as shown in FIG. 1, the input handler 124 may receive the selection 126 of one or more of the attributes 114A-C of the attribute list 120 and including a filter option 130 and a placement of the attribute icon 134A within the results portion 118B of the GUI 104.

The segmentation model may be provided in the results portion of the GUI, the segmentation model including a data set icon representing the plurality of items of the data set (320). For example, the view generator 116 may provide the segmentation model 150 in the results portion 118B of the GUI 104, the segmentation model 150 including the data set icon 122 representing the items 112 of the data set 110.

An attribute list may be provided in a segmentation portion of the GUI, the attribute list including a selectable list of the plurality of attributes (330). For example, the view generator 116 may provide the attribute list 120 in the segmentation portion 118A of the GUI 104, the attribute list 120 include the list of attributes 114A-C.

The attribute icon, associated with each selection, may be provided within the segmentation model based on the placement (340). For example, the view generator 116 may provide the attribute icon 134A, associated with the selection 126, within the segmentation model 150 based on a placement within the results portion 118B.

A flow indicator corresponding to the filter option associated with each attribute icon may be provided (350). For example, the view generator 116 may provide the flow indicator 137 corresponding to the filter option 130 associated with the attribute icon 134A.

A current subset of the plurality of items corresponding to each selection based on the placement and filter option may be obtained, wherein a previous subset of the plurality of items of a previous attribute icon within the segmentation model may be filtered to obtain the current subset (360). For example, the filter 128 may obtain the current subset 132 of the items 112 corresponding to the selection 126 based on the placement of the attribute icon 134A within the segmentation model 150 and filter option 130. Then for example, to obtain the subset 126 represented by the attribute icon 134B, the previous subset represented by the attribute icon 134A may be filtered.

The current subset may be filtered to update one or more subsequent subsets of one or more subsequent attribute icons within the segmentation model (370). For example, the filter 128 may filter the subset represented by the attribute icon 134A to update the subsequent subset represented by the attribute icon 134B within the segmentation model 150.

Figure 4:
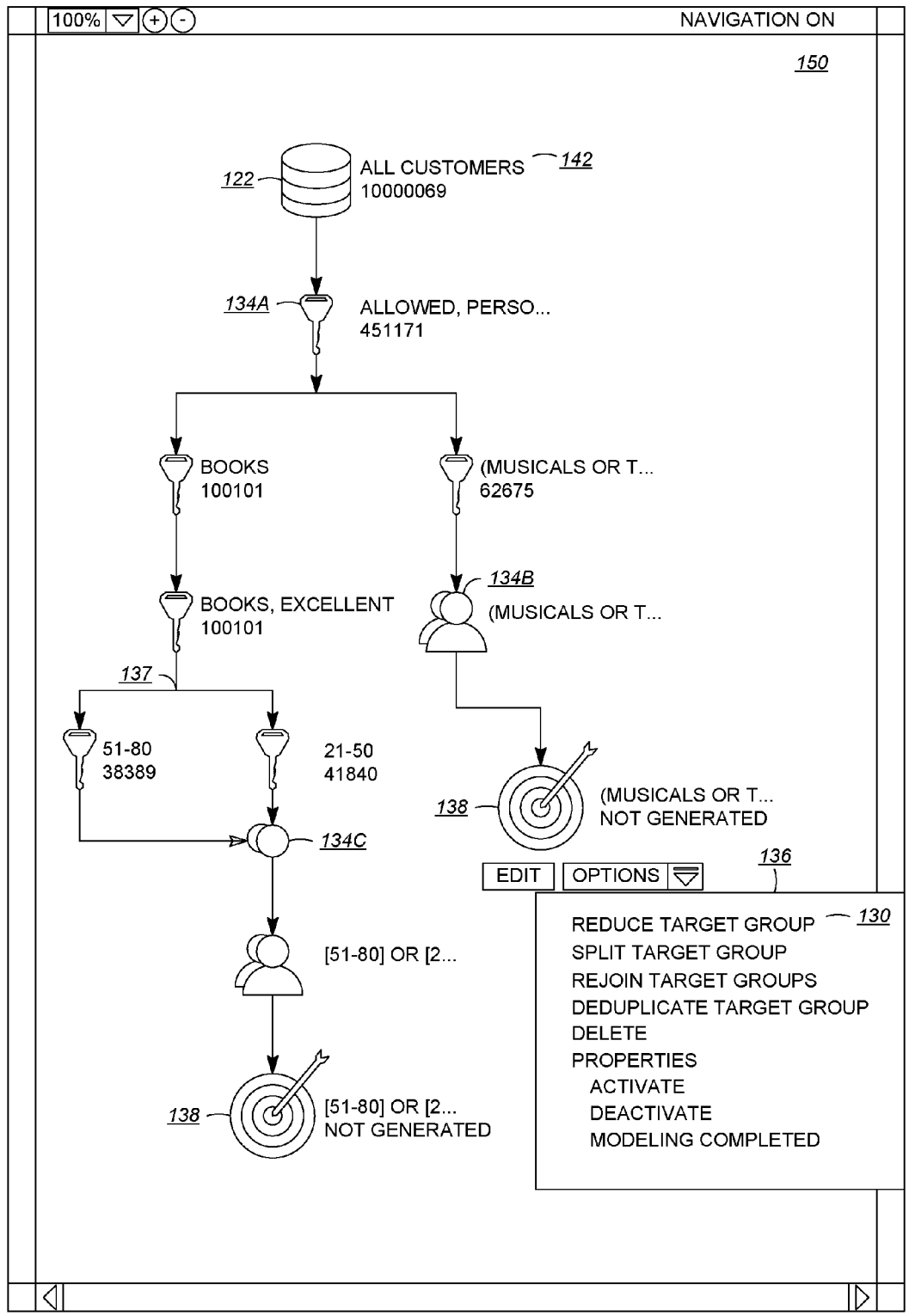
FIG. 4 is an example block diagram of a segmentation model, according to an example embodiment.

FIG. 4 is an example block diagram of a segmentation model 150, according to an example embodiment. The segmentation model 150 includes a data set icon 122. The data set icon 122 is associated with a count 142 that describes the set of data represented by the icon (e.g., "All Customers") and the number of items located within the set (e.g., "10000069").

The segmentation model 150 also includes three different types of attribute icons 134A, 134B and 134C. The attribute icon 134A may include a filter node wherein a portion of the items from the data set 122 may be filtered from the previous group. The attribute icon 134B may include a profile node wherein a portion of the items of the data set 122 may be filtered from the previous group and the results (e.g., which items are included within the group) may be retrieved or stored. The attribute icon 134C may include a Venn node representing a Venn operation being performed on two or more subsets, including a merge, remove or intersect operation.

The target icons 138 may represent target groups obtained from the data set 142, as a result of applying the previous filters or segmentations within the segmentation model 150. The filter search box 136 includes some exemplary filter options 130 that be may be performed with respect to the target group 138 "(Musicals OR T . . . ". The exemplary selectable filter options 130 may include reducing the target group, splitting the target group, rejoining target groups, deduplicating a target group, deleting, and going to properties. Deduplicating a target group may be used to modify the result of a filter combination, for example to remove or otherwise discount duplicated nodes resulting from the combination. According to an example embodiment, deduplicating may be applied to the entire segmentation model 150 rather than specifically to a single target icon 138. Other filter options 130 may also exist within the filter search box 136 that may not be applicable for the selected target icon 138, including, for example, activating, deactivating and completing modeling.

In the example of FIG. 4, the set of all customers may be filtered from over 10 million records to 451,171 based on the application of a first filter 'Allowed, Person'. The subset of 'Allowed, Person' records may then be split into records that include books and records that include musicals or theatre. The profile of the musicals or theatre subset may be retrieved (e.g., as indicated by the 134B profile node) and a target set 138 determined.

The books subset may then be filtered into the subset of excellent books, which may include the same number of records as the book subset as indicated by the counts 100, 101. The excellent books subset may then split into those records with 51-80 books and those records with 21-50 books, whereby these subsets may be rejoined as indicated by the Venn node 134C, a profile determined and a target set 138 identified.

Figure 5:
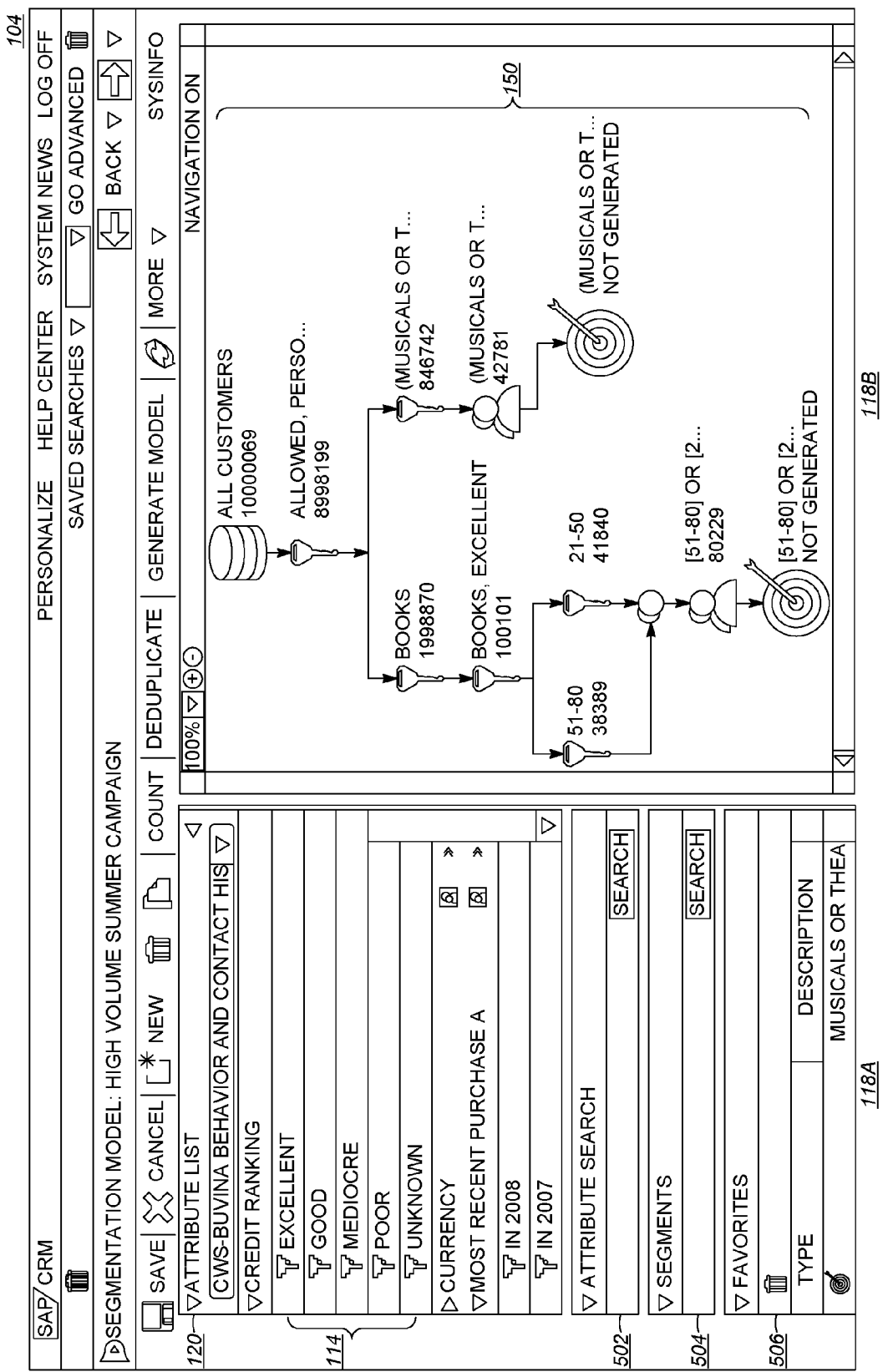
FIG. 5 is an example block diagram of a graphical user interface (GUI), according to an example embodiment.

FIG. 5 is an example block diagram of a graphical user interface (GUI) 104, according to an example embodiment. The GUI 104 may include the results portion 118B including the segmentation model 150 (e.g., the segmentation model of FIG. 4) and the segmentation portion 118A. The segmentation portion 118A may include the attribute list 120 with the attributes 114 that are subdivided into categories, including credit ranking, currency and most recent purchase. The credit ranking attribute list 120 may include the attributes 114: Excellent, Good, Mediocre, Poor and Unknown; the currency attribute list 120 may be minimized and thus none of the credit ranking attributes 114 may be currently visible without first expanding the list; and the most recent purchase attribute list 120 may include the attributes 114 in 2008 and in 2007.

The segmentation portion 118A may also include an attribute search box 502, a segments box 504 and a favorites box 506. The attribute search box 502 may be used to search the attribute list 120 for one or more attributes 114. For example, in an embodiment with a large number of attributes 114, not all of which may be displayed simultaneously, the attribute search box 502 may be utilized to find one or more specific attributes 114.

The segments box 504 may be used to search for one or more predefined segments from the current or previous segmentation models 150. For example, a segment may include a combination of one or more filter applications (e.g., attributes 114 and filter options) used to obtain a specific result or subset of data. The segments may be pre-defined or user-defined.

The favorites box 506 may include favorite or more often used filters by a user (e.g., 108). The favorites box 506 may be used to make generating the segmentation model 150 more user-friendly, whereby a user may have quick access to those filters used most often.

Figure 6:
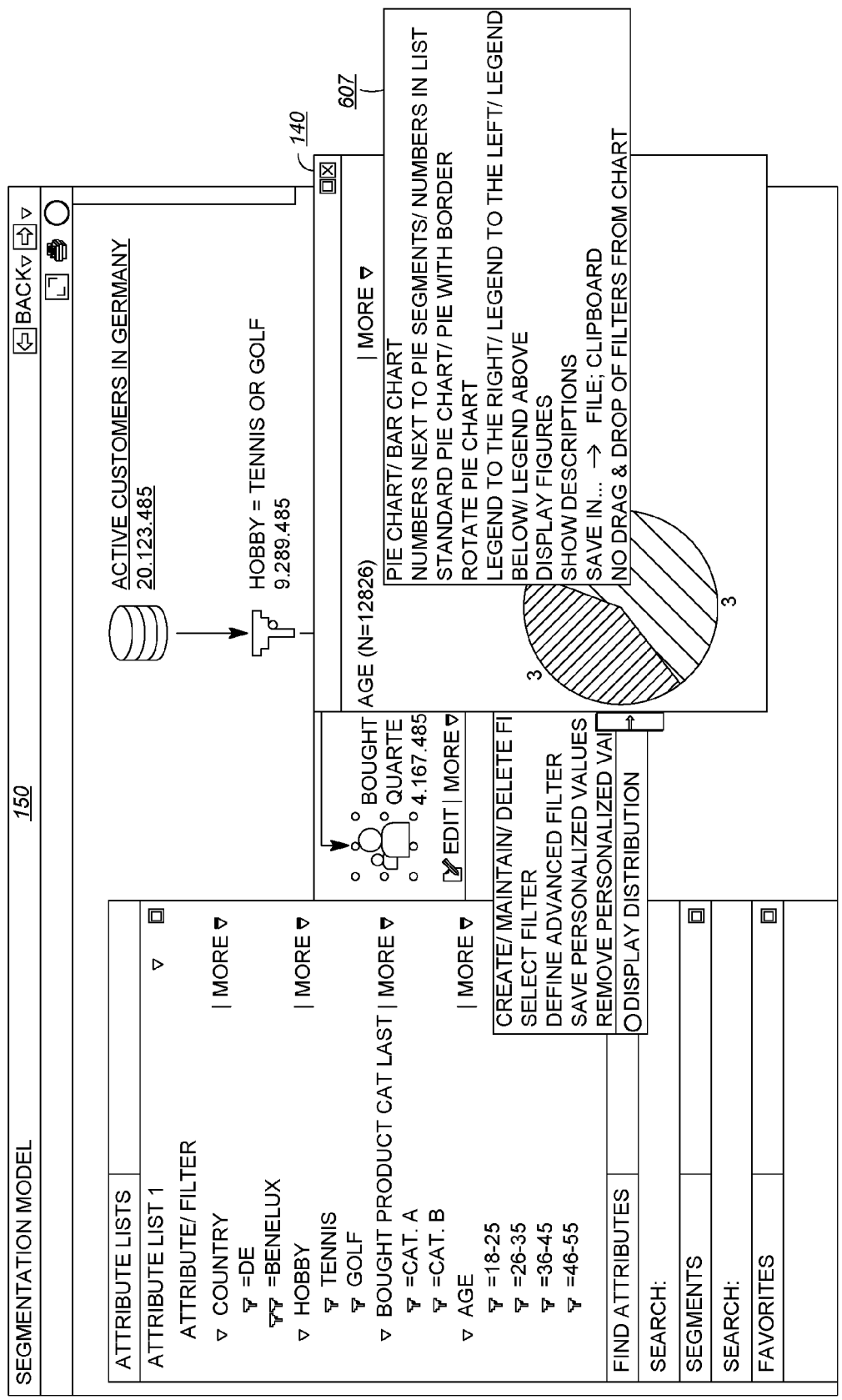
FIG. 6 is an example block diagram of a segmentation model, according to an example embodiment.

FIG. 6 is an example block diagram of a segmentation model 150, according to an example embodiment. The segmentation model 150 may include a count 140 in the form of a pie chart, showing the breakdown or relevance of items in a data set. A count selection box 602 may be used to select various options associated with the pie chart count 140. For example, the options associated with the count 140 (e.g., pie chart) may include: converting between a pie chart or bar chart, including numbers next to pie segments or next to the list, create a standard pie chart or a pie chart with a border, rotate the pie chart, placing the legend to the left, right, below or above, displaying figures, showing descriptions, save options, and drag-and-drop filter options. In other example embodiments, the count selection box 602 may include different options for various kinds of counts 140.

Figure 7:
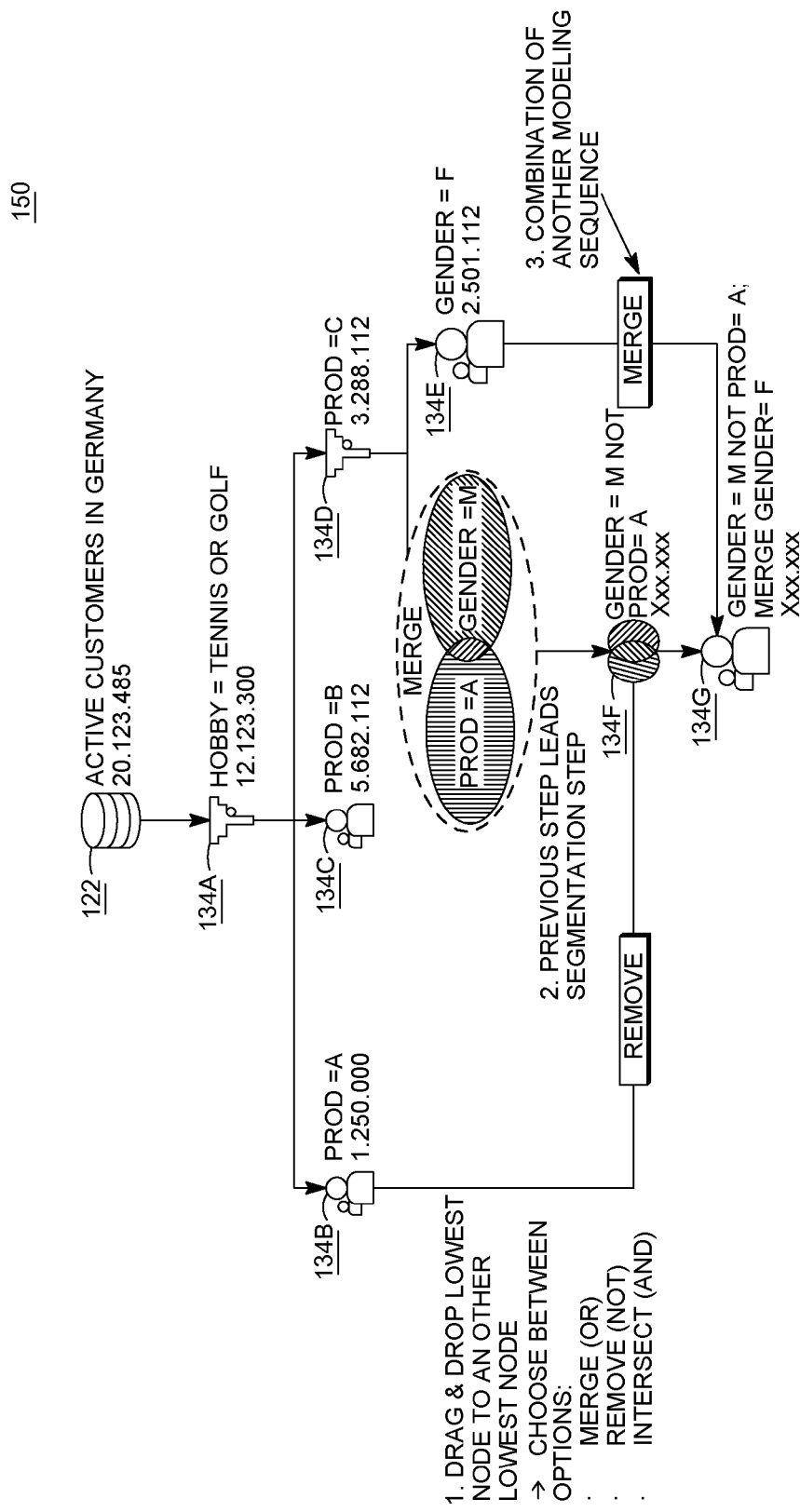
FIG. 7 is an example block diagram of at least a portion of a segmentation model, according to an example embodiment.

FIG. 7 is an example block diagram of at least a portion of a segmentation model 150, according to an example embodiment. The segmentation model 150 may include the data set icon 122 that is filtered to obtain those items with a hobby equal to tennis or golf as represented by the attribute icon 134A. The subset represented by 134A may then be split into three separate subsets 134B, C, and D, corresponding to those items with attributes equivalent to product A, B, and C, respectively.

Then for example, the subset represented by 134D may be split into those items with a female gender 134E and those without. The items without the female gender may then be merged (e.g., via a Venn operation) to include those items that do not include product A, resulting in the 134F subset. Then, the 134F subset may be merged with the 134E subset to yield or obtain the subset 134G that includes a merging between those items that include attributes gender male, product C and not product A and those items that include attributes gender female and product C.

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the embodiments.

What is claimed is:

1. Machine executable instructions stored on a computer-readable medium that, when executed on a data processing apparatus, are configured to cause the data processing apparatus to provide a graphical user interface (GUI) comprising:
   a segmentation portion configured to display:
      an attribute list including a plurality of selectable icons representing selectable attributes associated with a plurality of items of a data set, wherein each attribute is associated with a plurality of selectable filter options; and
   a results portion configured to display a segmentation model including:
      a data set icon representing the plurality of items of the data set,
      an attribute icon for each of the plurality of selectable attributes selected by a user from the selectable icons in the attribute list, the attribute icon representing a subset of the plurality of items, associated with the data set icon, filtered from the plurality of items of the data set based on the selected attributes from the attribute list, wherein a first subset from a first attribute icon is filtered to obtain a second subset for a second attribute icon subsequent to the first attribute icon in the segmentation model, and
      flow indicators indicating which of the filter icons were selected and relationships between two or more attribute icons and the data set icon in the segmentation model.

2. The machine executable instructions configured to provide the GUI of claim 1 wherein the results portion is configured to display the attribute icon for each of the plurality of selectable icons representing selectable attributes that are dragged from the attribute list and dropped into the results portion onto the segmentation model.

3. The machine executable instructions configured to provide the GUI of claim 1 wherein the results portion is configured to display the segmentation model including the data set icon representing a subset of the plurality of items of the data set filtered based on permissions associated with the user.

4. The machine executable instructions configured to provide the GUI of claim 1 wherein the results portion is configured to display the segmentation model including the flow indicators indicating a filter option selected for each selected attribute.

5. The machine executable instructions configured to provide the GUI of claim 1 wherein the results portion is configured to display the segmentation model including a count associated with each attribute icon, the count representing a size of the subset of the plurality of items corresponding to the selected attribute.

6. The machine executable instructions configured to provide the GUI of claim 1 wherein the results portion is configured to display the segmentation model including a target group icon representing a subset of the plurality of items filtered from the data set based on each of the selected attributes, the target group icon appearing subsequent to each of the attribute icons within the segmentation model.

7. The machine executable instructions configured to provide the GUI of claim 1 wherein the results portion is configured to display updates associated with one or more of the attribute icons based on a changed placement of one or more attribute icons within the results portion.

8. A system comprising:
a data warehouse including a computer-readable storage medium, and a data set, wherein the data set includes a plurality of items, each item associated with a plurality of attributes;
an input handler associated with a graphical user interface (GUI) and configured to receive selections of one or more of the attributes and including a filter option associated with each selection and a placement of an attribute icon representing each selection within a segmentation model displayed within a results portion of the GUI;
a view generator configured to:
provide the segmentation model in the results portion of the GUI, the segmentation model including a data set icon representing the plurality of items of the data set,
provide an attribute list in a segmentation portion of the GUI, the attribute list including a selectable list of the plurality of attributes,
provide the attribute icon, associated with each selection, within the segmentation model based on the placement, and
provide a flow indicator corresponding to the filter option associated with each attribute icon; and
a filter configured to obtain a current subset of the plurality of items corresponding to each selection based on the placement and filter option,
wherein a previous subset of the plurality of items of a previous attribute icon within the segmentation model is filtered to obtain the current subset, and
wherein the filter is configured to filter the current subset to update one or more subsequent subsets of one or more subsequent attribute icons within the segmentation model.

9. The system of claim 8 wherein:
the input handler is configured to receive a first selection of a first attribute; and
the view generator is configured to provide, responsive to the first selection, a filter search box including a plurality of filter options, wherein the input handler receives a selection of a first filter option from the plurality of filter options.

10. The system of claim 8 wherein the input handler is configured to receive the selections from the attribute list.

11. The system of claim 8 further comprising:
an indexer configured to index the plurality of items of the data set; and
the filter being configured to filter the indexed data to obtain the current subset.

12. The system of claim 8 further comprising a counter configured to count the plurality of items included in the current subset.

13. The system of claim 8 further comprising an access manager configured to determine permissions associated with a user of the system.

14. The system of claim 13 wherein the filter is configured to filter the plurality of items of the data set represented by the data set icon based on the permissions.

15. The system of claim 13 wherein the filter is configured to filter the plurality of attributes from the attribute list based on the permissions.

16. The system of claim 13 wherein:
the filter is configured to filter the plurality of items of the data set based on the selections of the one or more attributes to obtain a target group; and
the view generator is configured to provide a target group icon in the results portion representing the target group.

17. A method comprising:
providing a segmentation model in a results portion of a graphical user interface (GUI), the segmentation model including at least a data set icon representing a data set of a plurality of items associated with a plurality of attributes;
providing an attribute list in a segmentation portion of the GUI, the attribute list including the plurality of attributes;
receiving one or more attribute selections of one or more attributes from the attribute list within the results portion of the GUI;
providing, within the segmentation model, an attribute icon for each attribute selection;
providing, responsive to receiving each attribute selection, a plurality of filter options;
receiving a filter option selection from the plurality of filter options, the filter option selection indicating how to filter the items based on the attribute selection;
receiving a placement of the attribute icon within the segmentation model subsequent to the data set icon;
providing a flow indicator representing the filter option selection associated with each attribute icon; and
filtering the plurality items to obtain a current subset of the items corresponding to the attribute selection and filter option selection, wherein
if the placement of the attribute icon is subsequent to a previous attribute icon associated with a previous subset, then the filtering to obtain the current subset is performed with respect to the previous subset, and
if the placement of the attribute icon is prior to one or more subsequent attribute icons associated with one or more subsequent subsets, then the subsequent subsets are updated based on the current subset.

18. The method of claim 17 wherein the filtering comprises generating a target group including a subset of the plurality of items corresponding to a plurality of attribute selections and associated filter option selections.

19. The method of claim 17 wherein the filtering comprises generating multiple target groups resulting from the segmentation model, each target group including a subset of the plurality of items corresponding to one or more attribute selections and filter option selections.

20. The method of claim 17 wherein the filtering comprises re-combining two or more subsets that were previously split by one or more filter options within the segmentation model.

* * * * *